United States Patent
Chang et al.

(10) Patent No.: US 9,619,753 B2
(45) Date of Patent: Apr. 11, 2017

(54) DATA ANALYSIS SYSTEM AND METHOD

(71) Applicant: Winbond Electronics Corp., Taichung (TW)

(72) Inventors: Hsi-Chia Chang, Hsinchu (TW); Yen-Chin Liao, Hsinchu (TW)

(73) Assignee: Winbond Electronics Corp., Taichung (TW)

( * ) Notice: Subject to any disclaimer, the term of this patent is extended or adjusted under 35 U.S.C. 154(b) by 158 days.

(21) Appl. No.: 14/585,555

(22) Filed: Dec. 30, 2014

(65) Prior Publication Data

US 2016/0189048 A1   Jun. 30, 2016

(51) Int. Cl.
  *G06N 5/00* (2006.01)
  *G06F 1/00* (2006.01)
  *G06N 7/00* (2006.01)
  *G06K 9/00* (2006.01)

(52) U.S. Cl.
  CPC .............. *G06N 7/005* (2013.01); *G06K 9/00* (2013.01)

(58) Field of Classification Search
  CPC ............. G06N 5/04; G06N 7/005; G06N 5/02
  See application file for complete search history.

(56) References Cited

U.S. PATENT DOCUMENTS

| 7,383,237 B2 | 6/2008 | Zhang et al. |
| 8,374,974 B2 | 2/2013 | Chen et al. |
| 2014/0037216 A1 | 2/2014 | Kumar et al. |
| 2015/0071528 A1* | 3/2015 | Marchisio ............ G06K 9/6269 382/159 |
| 2015/0199010 A1* | 7/2015 | Coleman .............. A61B 5/0006 345/156 |

FOREIGN PATENT DOCUMENTS

| TW | I240216 B | 9/2005 |
| TW | 200537392 A | 11/2005 |
| TW | 201250607 A | 12/2012 |

* cited by examiner

*Primary Examiner* — Stanley K Hill
*Assistant Examiner* — Kalpana Bharadwaj
(74) *Attorney, Agent, or Firm* — Muncy, Geissler, Olds & Lowe, P.C.

(57) ABSTRACT

A data analysis system includes a modeling unit, a feature-extraction unit, a processing unit and an output unit. The modeling unit creates a prediction model by a machine learning algorithm according to training data. The feature-extraction unit extracts a plurality of fragment of feature data of input data, and classifies the feature data into a plurality of groups. The processing unit obtains a probability of the input data corresponding to the prediction model by the machine learning algorithm according to the feature of one of the groups, and determines the probability. When the probability is less than a predetermined value, the processing unit uses another feature data corresponding to another group which is not used to renew the probability of the input data corresponding to the prediction model through the machine learning algorithm. When the probability is greater than or equal to the predetermined value, the processing unit classifies the input data. The output unit outputs a classification result.

13 Claims, 6 Drawing Sheets

DATA ANALYSIS SYSTEM AND METHOD

BACKGROUND OF THE INVENTION

Field of the Invention

The application relates in general to a data analysis system and method, in particular to a data analysis system and method for updating the probability of the input data by the prediction model according to the different features of the input data.

Description of the Related Art

These days, due to rapid technological developments, users are able to transform data into meaningful information, and predict behavior using algorithms specification to the information. Users can create a model by using a machine learning algorithm, and classify the data according to the relevance of the input data and the model. Due to the accuracy of the prediction being related to the complexity of the algorithm, the algorithm needs a large amount of data and a long operation time to arrive at an accurate prediction. Thus, how to improve the efficiency of the algorithm is a problem which needs to be solved immediately.

BRIEF SUMMARY OF INVENTION

An embodiment of the invention provides a data analysis system, including a modeling unit, a feature-extraction unit, a processing unit and an output unit. The modeling unit creates a prediction model using a machine learning algorithm and training data. The feature-extraction unit extracts a plurality of pieces of feature data from input data, and classifies the feature data into a plurality of groups. The processing unit obtains a probability of the input data corresponding to the prediction model of the machine learning algorithm according to the feature data corresponding to one of the groups, and determines the probability. The processing unit further selects the feature data of one of the unselected groups when the probability is less than a predetermined value, and updates the probability of the input data corresponding to the prediction model by the machine learning algorithm, or classifies the input data according to the probability when the probability is greater than or equal to the predetermined value. The output unit outputs a classification result.

Another embodiment of the invention provides a data analysis method, including: creating a prediction model by a machine learning algorithm according to training data; receiving input data comprising a plurality of feature data; extracting the feature data of the input data, and classifying the feature data into a plurality of groups; obtaining a probability of the feature data by using the machine learning algorithm according to the feature data of one of the groups; determining the probability. The feature data of one of the unselected groups is selected when the probability is less than a predetermined value, and the probability of the input data corresponding to the prediction model will be updated by the machine learning algorithm according to the selected feature data. Otherwise, the input data will be classified when the probability is greater than or equal to the predetermined value.

Another embodiment of the invention provides a data analysis system, including: a modeling unit, a feature-extraction unit, a processing and an output unit. The modeling unit creates a prediction model by a machine learning algorithm according to training data. The feature-extraction unit extracts a plurality of piece of feature data of input data, and classifies the feature data into a first group and a second group. The processing unit obtains a first probability and a second probability corresponding to the prediction model according to a part of feature data corresponding to the first group and a part of feature data corresponding to the second group respectively. The processing unit further obtains a determination result by selecting all feature data of the first group or the second group according to the first probability and the second probability. The output unit outputs the determination result.

Another embodiment of the invention provides a data analysis method, including: creating a prediction model by a machine learning algorithm according to training data; receiving input data including a plurality of fragment of feature data; classifying the feature data into a first group and a second group; obtaining a first probability and a second probability corresponding to the prediction model according to a part of feature data corresponding to the first group and a part of feature data corresponding to the second group respectively; obtaining a determination result by selecting all feature data of the first group or the second group according to the first probability and the second probability; and outputting the determination result.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Further areas to which the present systems and methods can be applied will become apparent from the detailed description provided herein. It should be understood that the detailed description and specific examples, while indicating exemplary embodiments of the data analysis system and method, are intended for purposes of illustration only and are not intended to limit the scope of the invention.

Figure 1:
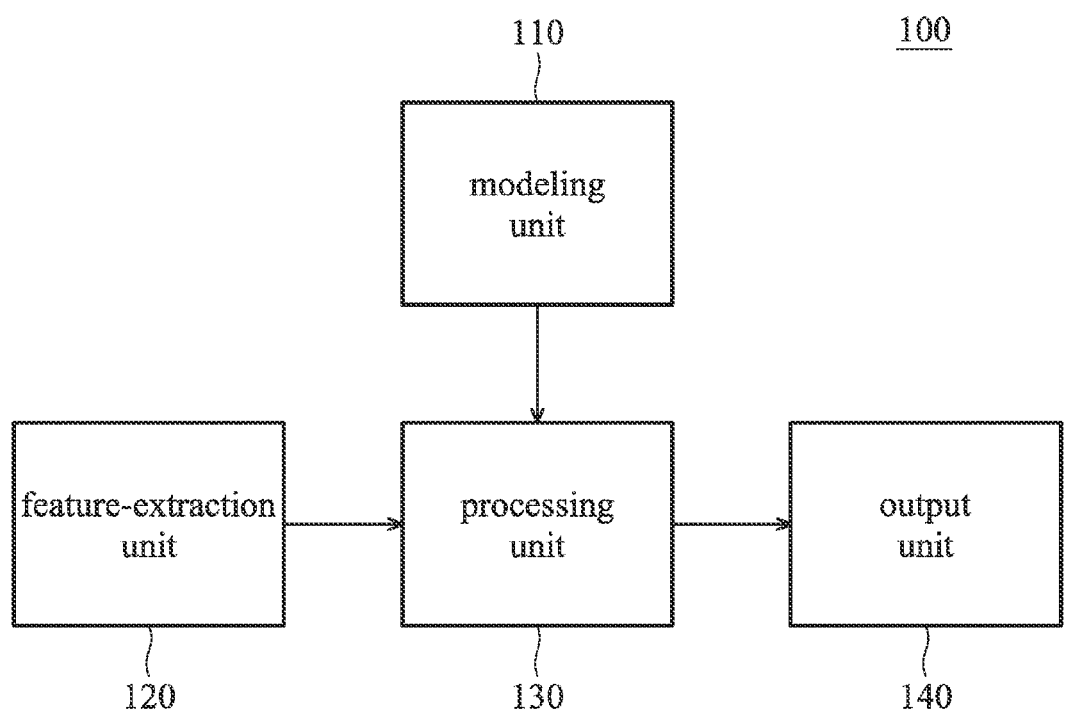
FIG. 1 is a block diagram of a data analysis system in accordance with an embodiment of the invention.

FIG. 1 is a block diagram of a data analysis system in accordance with an embodiment of the invention. As shown in FIG. 1, the data analysis system 100 includes a modeling unit 110, a feature-extraction unit 120, a processing unit 130 and an output unit 140. The modeling unit 110 creates a prediction model by a machine learning algorithm according to training data. The modeling unit 110 extracts the eigenvalues according to the type of machine learning algorithm as the training data for creating the prediction model. The feature-extraction unit 120 extracts a plurality of piece of feature data of the input data, and classifies the feature data into a plurality of groups. The feature-extraction unit 120 further classifies the feature data according to a predetermined weighting of the input data corresponding to the machine learning algorithm. The processing unit 130 obtains the probability of the input data corresponding to the prediction model by the machine learning algorithm according to the feature data corresponding to one of the groups. The processing unit 130 further selects the feature data of one of the unselected groups when the probability is less than a predetermined value, and updates the probability of the input data corresponding to the prediction model by the machine learning algorithm. The processing unit 130 determines that a classification of the input data is different from the training data when there is no unselected-group and the probability is less than the predetermined value. The output unit 140 outputs a classification result.

Figure 2:
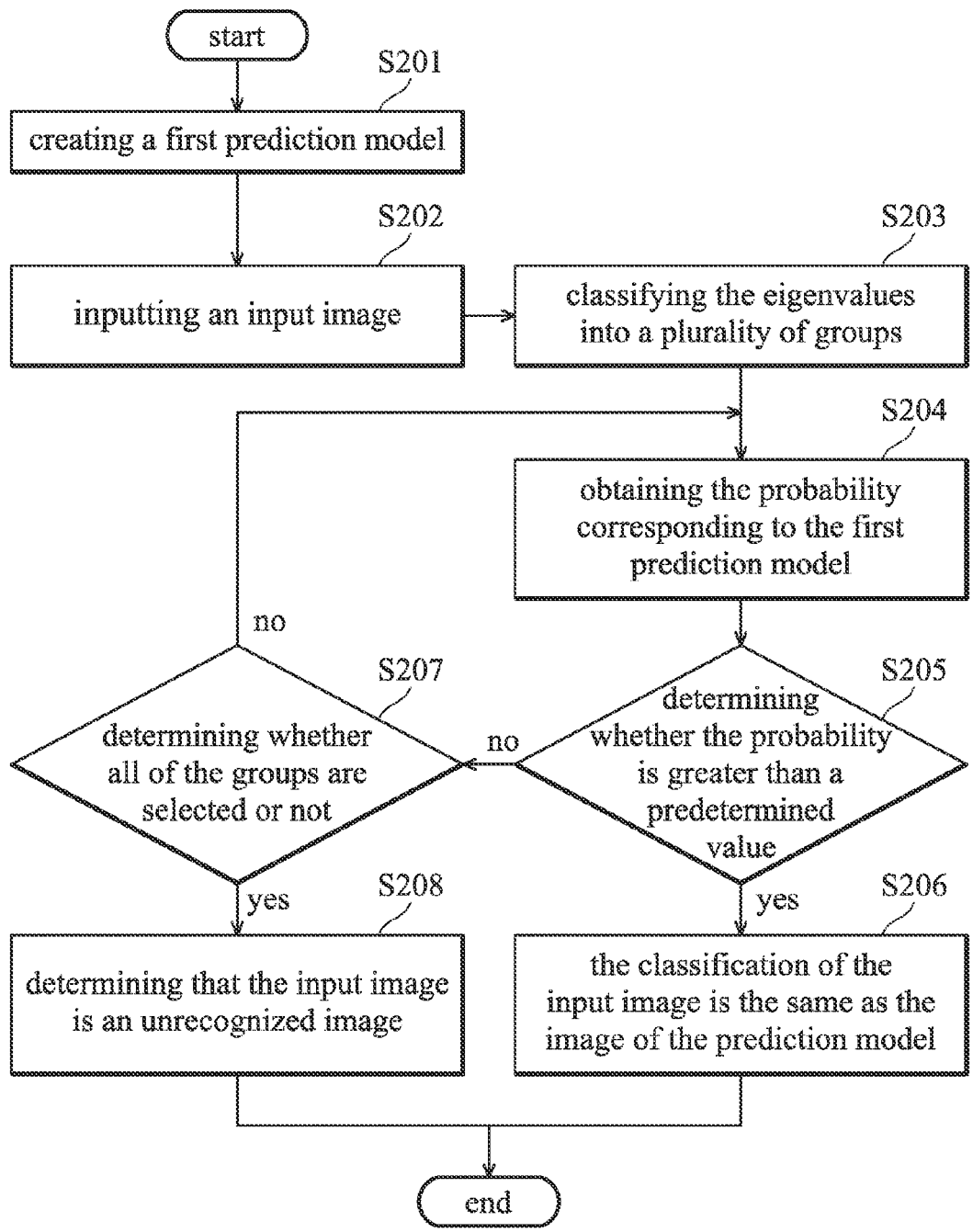
FIG. 2 is a flow chart of a data analysis method in accordance with an embodiment of the invention.

Please refer to FIG. 2 with FIG. 1. FIG. 2 is a flow chart of a data analysis method in accordance with an embodiment of the invention. In the embodiment, the data analysis method is adapted to a License Plate Recognition System. First, in step S201, the modeling unit 110 uses the machine learning algorithm to create a first prediction model according to the training images of one or a plurality of numbers 0 to 9. The first prediction model is used to determine the relevance between the input images and the training images. In step S202, an input image is received by the feature-extraction unit 120. At step S203, the extraction unit 120 extracts a plurality of eigenvalues of the input images according to the type of the machine learning algorithm, and classifies the eigenvalues into a plurality of groups according to the weightings. For example, the size of an input image are 100*100 pixels, each pixel can be considered an eigenvalue. In other words, the input image has 10000 eigenvalues. The extraction unit 120 classifies the eigenvalues into 40 groups. The feature data always relates to the color information and the edge information due to the input image being image data. Otherwise, the extraction unit 120 further assigns the adjustable weighting to the feature data according to the type of the machine learning algorithm, and the weighting of the feature data can be adjusted according to the demand of the system.

At step S204, the processing unit 130 selects the eigenvalues with the highest weighting as the eigenvalues for the machine learning algorithm, and obtains the probability corresponding to the first prediction model. At step S205, after obtaining the probability, the processing unit 130 further determines whether the probability is greater than a predetermined value. When the probability is greater than or equal to the predetermined value, the method goes to step S206, the processing unit 130 determines that the classification of the input image is the same as the image of the prediction model.

Otherwise, when the probability is less than the predetermined value, the method goes to step S207, the processing unit 130 determines whether all of the groups are selected or not. When there is an unselected group, the method goes back to step S204, the processing unit 130 selects the group with the largest weighting and the group with the second largest weighting as the eigenvalues of the machine learning algorithm. So on, when the probability is less than the predetermined value over and over again, the processing unit 130 continuously adds the unselected groups according to the weighting as the eigenvalues of the machine learning algorithm. When there is no unselected-group and the probability is less than the predetermined value, the method goes to step S208, and the processing unit 130 determines that the input image is an unrecognized image.

It should be noted that users can determine the number of operations of the processing unit 130. For example, when the five groups are selected as the eigenvalues of the machine learning algorithm and the probability is still less than the predetermined value, the processing unit 130 determines input image as an unrecognized image. As a result, that the processing efficiency will improve and the operation time of the processing unit 130 will be reduced.

Figure 3:
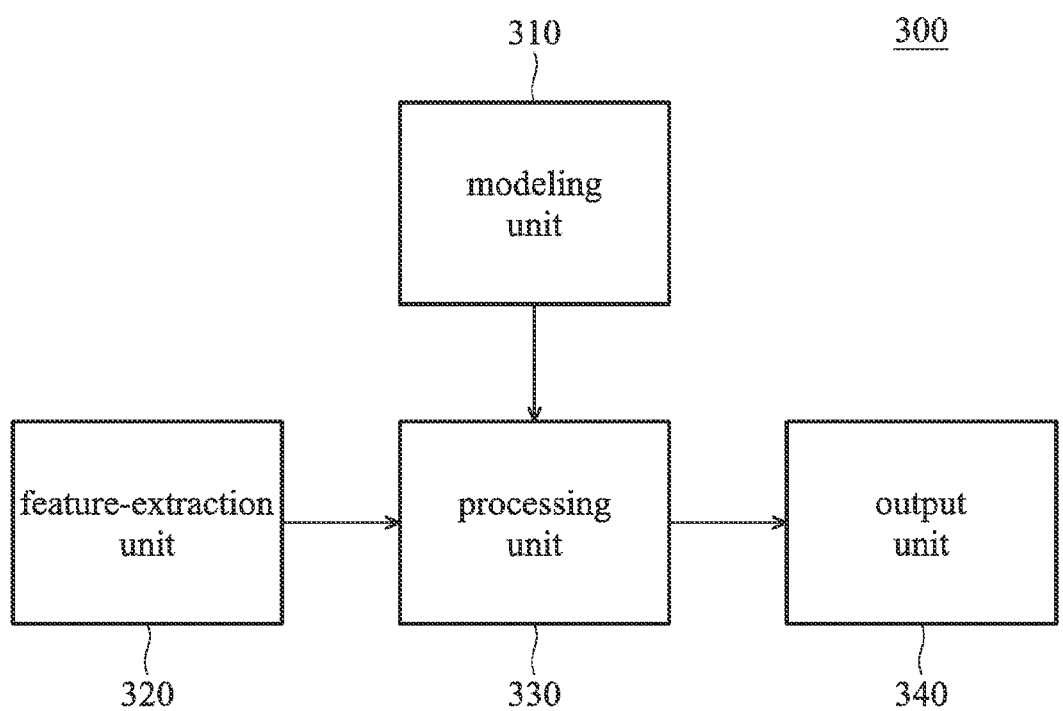
FIG. 3 is a block diagram of the data analysis system in accordance with another embodiment of the invention.

FIG. 3 is a block diagram of the data analysis system in accordance with another embodiment of the invention. In the embodiment, the data analysis system 300 is adapted to an abnormal event detection system for a production line. As shown in FIG. 3, the data analysis system 300 includes a modeling unit 310, a feature-extraction unit 320, a processing unit 330 and an output unit 340. The modeling unit 310 creates a first abnormal event prediction model by a machine learning algorithm according to first training data having a plurality of first parameters, and creates a second abnormal event prediction model by the machine learning algorithm according to second training data having a plurality of second parameters. The modeling unit 310 extracts the parameters according to the type of machine learning algorithm as the training data for creating the abnormal event prediction model. The feature-extraction unit 320 extracts the parameters of the input data, and classifies the feature data into a plurality of groups. The feature-extraction unit 320 further classifies the feature data according to a predetermined weighting of the input data corresponding to the machine learning algorithm. The processing unit 330 obtains a first probability of the input data corresponding to the first abnormal event prediction model by the machine learning algorithm according to the feature data corresponding to one of the groups, and determines the first probability. The processing unit 330 determines that the parameters of the input data are the same as the first abnormal event prediction model when the first probability is greater than or equal to the predetermined value, which means the output of the production line is normal. Otherwise, the processing unit 330 further selects the parameters of one of the unselected groups according to the weightings when the first probability is less than the predetermined value, and updates the probability of the input data corresponding to the first abnormal event prediction model by the machine learning algorithm. The processing unit 330 determines that the input data is abnormal when there is no unselected-group and the probability is still less than the predetermined value. The output unit 140 outputs a classification result. The processing unit 330 obtains a second probability of the input data corresponding to the second abnormal event prediction model by the machine learning algorithm according to the feature data corresponding to one of the groups when the processing unit 330 determines that the input data is abnormal, and than determines the second probability. The method for determining the second probability is the same as the first probability, thus it is not described herein. The output unit 340 outputs a determination result according to the first probability and the second probability.

Figure 4:
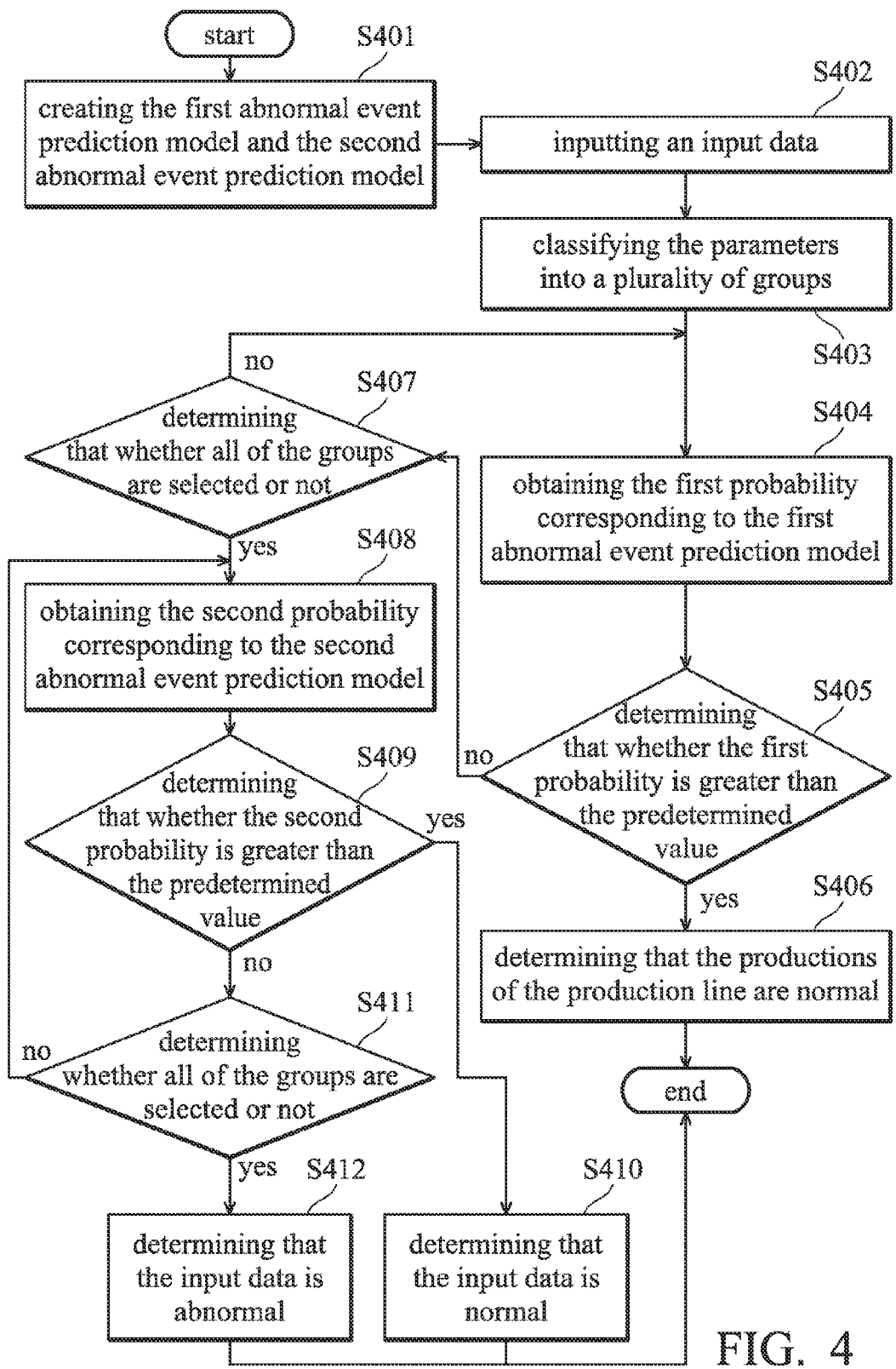
FIG. 4 is a flow chart of the data analysis method in accordance with another embodiment of the invention.

Please refer to FIG. 4 with FIG. 3. FIG. 4 is a flow chart of the data analysis method in accordance with another embodiment of the invention. First, at step S401, the modeling unit 310 creates the first abnormal event prediction model by the machine learning algorithm according to the first training data having the plurality of first parameters, and creates the second abnormal event prediction model by the machine learning algorithm according to the second training data having the plurality of second parameters. The first training data and the second training data is the data of the normal output of the production line. The abnormal event prediction model is used to determine the relevance between the input images and the training images. At step S402, input data having the plurality of parameters is received by the feature-extraction unit 320. The extraction unit 320 further assigns an adjustable weighting to the parameters according to the type of the machine learning algorithm, and the weighting of the feature data can be adjusted according to the demand of the system. At step S403, the extraction unit 320 classifies the parameters into a plurality of groups according to the weightings. For example, the input data has 200 parameters, and the extraction unit 120 classifies the parameters into 10 groups according to the weightings.

At step S404, the processing unit 330 selects the eigenvalues with the largest weighting as the parameters for the machine learning algorithm, and obtains the first probability corresponding to the first abnormal event prediction model. At step S405, after obtaining the first probability, the processing unit 330 further determines that whether the first probability is greater than the predetermined value. When the probability is greater than or equal to the predetermined value, the method goes to step S406, the processing unit 330 determines that the parameters of the input data are the same as the first abnormal event prediction model, which means the productions of the production line are normal.

Otherwise, when the first probability is less than the predetermined value, the method goes to step S407, the processing unit 330 determines that whether all of the groups are selected or not. When there has an unselected-group, the method goes back to step S404, the processing unit 330 selects the group with the largest weighting and the group with the second largest weighting as the parameters of the machine learning algorithm for updating the first probability. In other words, the processing unit 330 only selects the parameters of one group for the first operation, and when the first probability is less than the predetermined value, the processing unit 330 selects the parameters of two groups for the second operation. So on, when the probability is less than the predetermined value over and over again, the processing unit 130 adds the unselected groups according to the weighting as the parameters of the machine learning algorithm continuously. When there is no unselected-group and the first probability is less than the predetermined value, the method goes to step S408, the processing unit 330 selects the parameters with the largest weighting as the parameters for the machine learning algorithm, and obtains the second probability corresponding to the second abnormal event prediction model. At step S409, the processing unit 330 determines that whether the second probability is greater than the predetermined value or not. When the second probability is greater than or equal to the predetermined value, the method goes to step S410, the processing unit 330 determines that the determination result of the first abnormal event prediction model is false, and determines that the production corresponding to the input data is normal. Otherwise, when the second probability is less than the predetermined value, the method goes to step S411, the processing unit 330 selects the group with the largest weighting and the group with the second largest weighting as the parameters of the machine learning algorithm for updating the second probability. When there is no unselected-group and the second probability is less than the predetermined value, the method goes to step S412, the processing unit 330 determines that the input data is abnormal.

It should be noted that users can determine the number of operations of the processing unit 330. For example, when the five groups are selected as the eigenvalues of the machine learning algorithm and the probability is still less than the predetermined value, the processing unit 330 determines input image as an unrecognized image. As the result, that will improve the processing efficiency and reduce the operation time of the processing unit 330.

Figure 5:
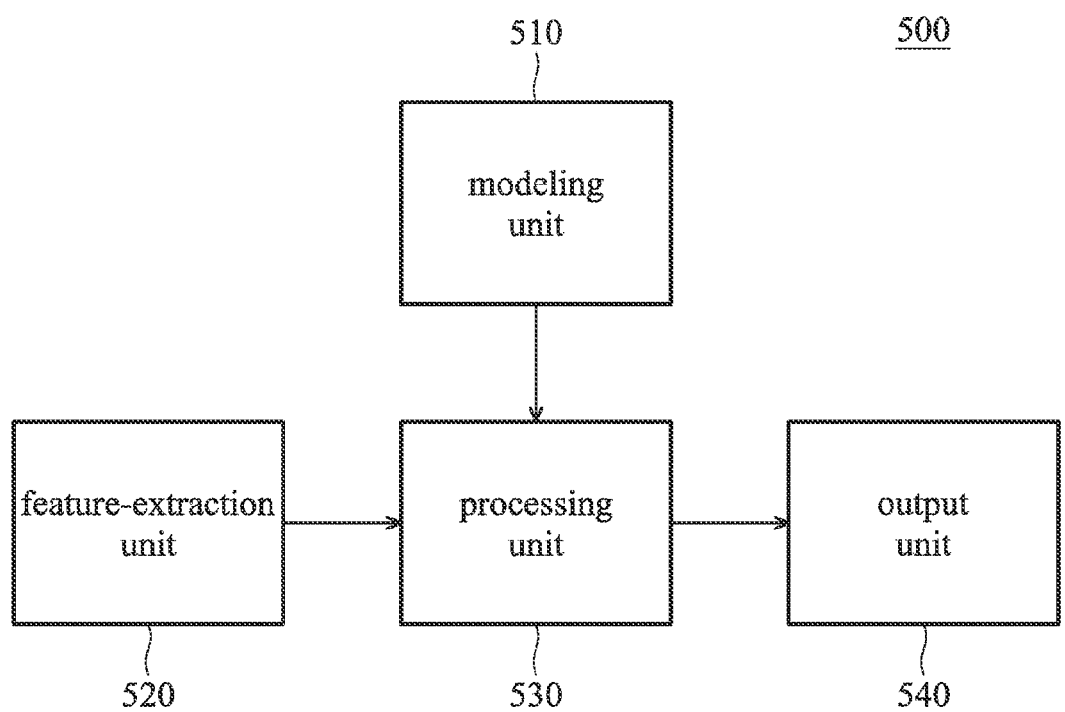
FIG. 5 is a block diagram of the data analysis system in accordance with another embodiment of the invention.

FIG. 5 is a block diagram of the data analysis system in accordance with another embodiment of the invention. In the embodiment, the data analysis system 500 is adapted to a vehicle tracking and path prediction system. As shown in FIG. 5, the data analysis system 500 includes a modeling unit 510, a feature-extraction unit 520, a processing unit 530 and an output unit 540. The modeling unit 510 creates a path prediction model by the machine learning algorithm according to a license plate image. The feature-extraction unit 520 classifies the feature data of the input image into a first group and a second group according to time functions. The processing unit 530 obtains a first probability and a second probability corresponding to the path prediction model by the machine learning algorithm according to a part of feature data corresponding to the first group and a part of feature data corresponding to the second group respectively.

The processing unit 530 further compares the first probability and the second probability. The processing unit 530 updates the first probability by the machine learning algorithm according to all of the feature data of the first group when the first probability is greater than the second probability, and determines that whether the first probability is greater than or equal to the predetermined value or not. The processing unit 530 obtains the determination result according to the first probability when the first probability is greater than or equal to the predetermined value. Otherwise, the processing unit 530 updates the second probability by the machine learning algorithm according to all of the feature data of the second group when the first probability is less than the predetermined value, and obtains the determination result according to the second probability. The output unit 540 outputs the determination result.

Figure 6:
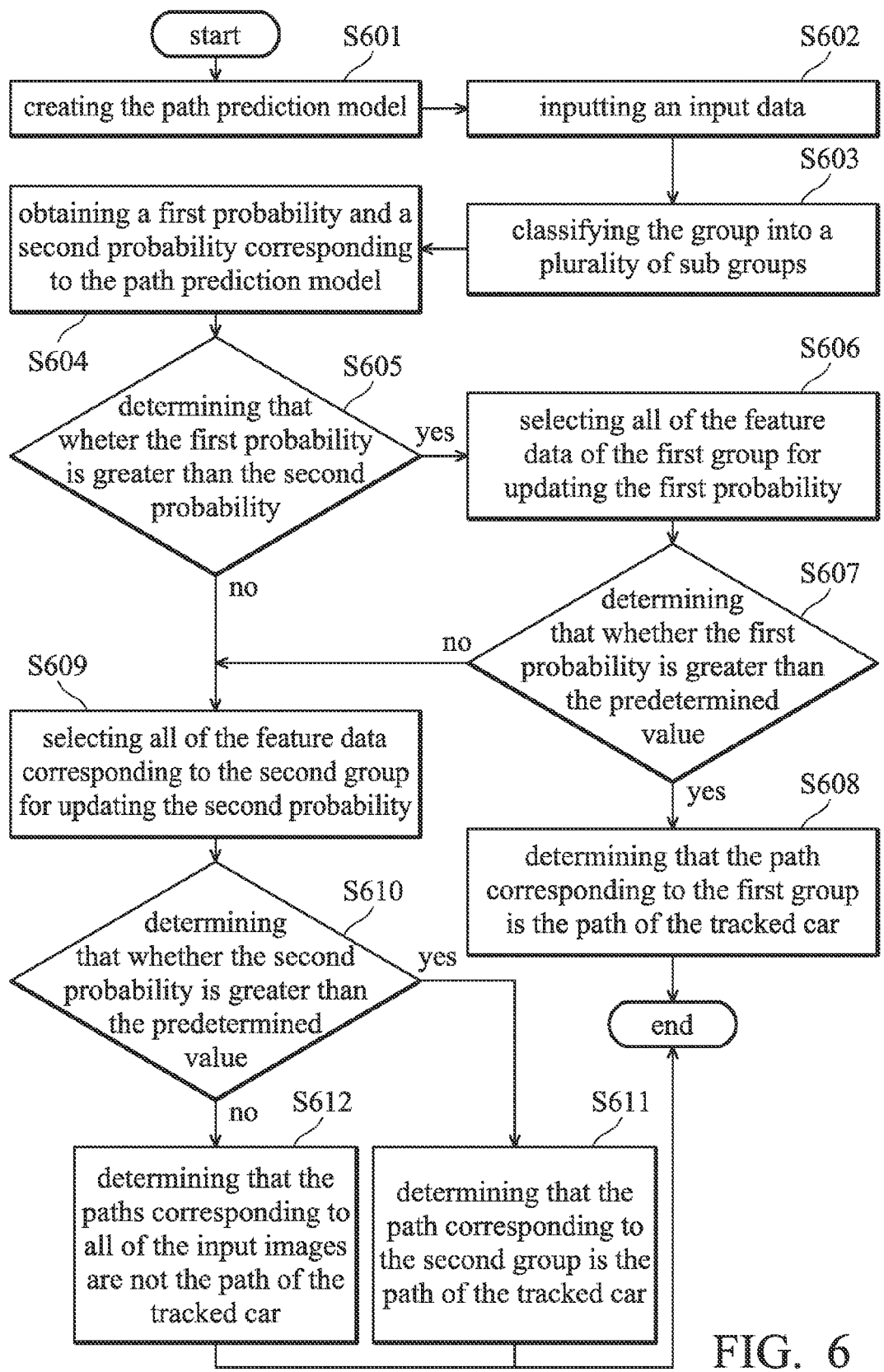
FIG. 6 is a flow chart of the data analysis method in accordance with another embodiment of the invention.

Please refer to FIG. 6 with FIG. 5. FIG. 6 is a flow chart of the data analysis method in accordance with another embodiment of the invention. At step S601, the modeling unit 510 creates the path prediction model by the machine learning algorithm according to a tracked license plate image. The path prediction model is used to determine the relevance between the input images and the license plate image. The input data includes a plurality of license plate images captured by different cameras at different times. In step S602, the feature-extraction unit 520 classifies the input image into a first group and a second group according to time and the relationship of each camera. The first group is related to a first prediction path and the second group is related to a second prediction path. Then, in step S603, the feature-extraction unit 520 further classifies the first group into a first sub group and a second sub group, and classifies the second group into a third sub group and a fourth sub group.

At step S604, the processing unit 530 obtains a first probability and a second probability corresponding to the path prediction model by the machine learning algorithm according to the feature data of the first sub group and the feature data of the third sub group respectively. A step S605, the processing unit 530 determines the values of the first probability and the second probability, and selects the largest one as the prediction path. When the first probability is greater than the second probability, the method goes to step S606, the processing unit 530 selects the feature data of the first sub group and the second sub group as the parameters of the machine learning algorithm for updating the first probability corresponding to the path prediction model. At step S607, the processing unit 530 determines that whether the first probability is greater than the predetermined value or not. When the first probability is greater than or equal to the predetermined value, the method goes to step S608, the processing unit 530 determines that the license plate images of the first group is similar to the tracked license plate image, which means the path corresponding to the first group is the path of the tracked car.

Otherwise, when the first probability is less than the predetermined value, the processing unit 530 determines that the license plate images of the first group is different from the tracked license plate image, which means the path corresponding to the first group is not the path of the tracked car. Then, the method goes to step S609, the processing unit 530 reselects the feature data corresponding to the third sub group and the fourth sub group as the parameters of the machine learning algorithm for updating the second probability corresponding to the path prediction model. At step S610, the processing unit 530 further determines that whether the second probability is greater than the predetermined value or not. When the second probability is greater than or equal to the predetermined value, the method goes to step S611, the processing unit 530 determines that the license plate images of the second group is similar to the tracked license plate image, which means the path corresponding to the second group is the path of the tracked car. When the second probability is less than or equal to the predetermined value, the method goes to step S612, the processing unit 530 determines that the paths corresponding to all of the input images are not the path of the tracked car.

As described above, an embodiment of the invention provide a data analysis system and method, users can select a part of the feature data for obtaining the probability corresponding to the prediction model mode by the machine learning algorithm, and determine whether to select more feature data for improving the accuracy of the prediction result. As the result, that will improve the processing efficiency and reduce the operation time of the system.

It will be apparent to those skilled in the art that various modifications and variations can be made to the structure disclosed without departing from the scope or spirit of the invention. In view of the foregoing, it is intended that the present invention covers modifications and variations of this invention, provided they fall within the scope of the following claims and their equivalents.

What is claimed is:

1. A data analysis system, comprising:
   a modeling unit, using a machine learning algorithm to create a prediction model by training data;
   a feature-extraction unit, extracting a plurality of fragments of feature data of input data, and classifying the feature data into a plurality of groups according to a predetermined weighting corresponding to the machine learning algorithm;
   a processing unit, selecting one of the groups of the feature data according to a weighting sequence corresponding to the weighting as input feature data, obtaining a probability of the input data corresponding to the prediction model by the machine learning algorithm according to the input feature data, and determining the probability, wherein the processing unit adds the feature data of one of the unselected groups according to the weighting sequence as the input feature data when the probability is less than a predetermined value; updating the probability of the input data corresponding to the prediction model by the machine learning algorithm; and classifying the input data according to the probability when the probability is greater than or equal to the predetermined value; and
   an output unit, outputting a classification result.

2. The data analysis system as claimed in claim 1, wherein the processing unit determines that a classification of the input data is different from the training data when there is no unselected group and the probability is less than the predetermined value.

3. The data analysis system as claimed in claim 1, wherein the classification of the input data is the same as the training data when the probability is greater than or equal to the predetermined value.

4. A data analysis method, comprising:
   creating a prediction model by a machine learning algorithm according to training data;
   receiving input data comprising a plurality of fragment of feature data;
   extracting the feature data of the input data, and classifying the feature data into a plurality of groups according to a predetermined weighting corresponding to the machine learning algorithm;
   selecting one of the groups of the feature data according to a weighting sequence corresponding to the weighting as input feature data;
   obtaining a probability of the feature data by the machine learning algorithm according to input feature data; and
   determining the probability,
   wherein the feature data of one of the unselected groups is added according to the weighting sequence as the input feature data when the probability is less than a predetermined value, the probability of the input data corresponding to the prediction model will be updated by the machine learning algorithm according to the selected feature data, and the input data will be classified when the probability greater than or equal to the predetermined value.

5. The data analysis method as claimed in claim 4, further comprising:
   determining that a classification of the input data is different from the training data when there is no unselected-group and the probability is less than the predetermined value.

6. The data analysis method as claimed in claim 4, further comprising:
   determining that the classification of the input data is the same as the training data when the probability is greater than or equal to the predetermined value.

7. A data analysis system, comprising:
   a modeling unit, creating a prediction model by a machine learning algorithm according to training data;
   a feature-extraction unit, extracting a plurality of piece of feature data of input data, and classifying the feature data into a first group and a second group
   a processing unit, selecting a part of feature data corresponding to the first group and a part of feature data corresponding to the second group as input feature data for obtaining a first probability and a second probability corresponding to the prediction model respectively, comparing the first probability and the second probability for selecting all feature data of the first group or all feature data of the second group as the input feature to obtain a determination result by the machine learning algorithm; and
   an output unit, outputting the determination result.

8. The data analysis system as claimed in claim 7, wherein the processing unit updates the first probability by the machine learning algorithm according to all of the feature data corresponding to the first group when the first probability is greater than or equal to the second probability, determines whether the first probability is greater than or equal to a predetermined value, and obtains the determination result according to the first probability when the first probability is greater than or equal to the predetermined value.

9. The data analysis system as claimed in claim 7, wherein the processing unit updates the second probability by the machine learning algorithm according to all of the feature data corresponding to the second group when the first probability is less than the second probability, and obtains the determination result according to the second probability.

10. The data analysis system as claimed in claim 7, wherein the feature-extraction unit further classifies the feature data into the first group and the second group according to a time function.

11. A data analysis method, comprising:
creating a prediction model by a machine learning algorithm according to training data;
receiving input data comprising a plurality of fragment of feature data;
classifying the feature data into a first group and a second group;
selecting a part of feature data corresponding to the first group and a part of feature data corresponding to the second group as input feature data for obtaining a first probability and a second probability corresponding to the prediction model respectively;
comparing the first probability and the second probability for selecting all feature data of the first group or all feature of the second group as the input feature to obtain a determination result by the machine learning algorithm; and
outputting the determination result.

12. The data analysis method as claimed in claim 11, further comprising:
updating the first probability by the machine learning algorithm according to all of the feature data corresponding to the first group when the first probability is greater than or equal to the second probability, determining whether the first probability is greater than or equal to a predetermined value; and
obtaining the determination result according to the first probability when the first probability is greater than or equal to the predetermined value.

13. The data analysis method as claimed in claim 11, further comprising:
updating the second probability by the machine learning algorithm according to all of the feature data corresponding to the second group when the first probability is less than the second probability; and
obtaining the determination result according to the second probability.

* * * * *